United States Patent [19]
Weisse et al.

[11] Patent Number: 5,419,040
[45] Date of Patent: May 30, 1995

[54] HOLLOW FAN BLADE FABRICATION

[75] Inventors: Michael A. Weisse, Tolland; David B. Carter, Manchester, both of Conn.

[73] Assignee: United Technologies Corporation, Hartford, Conn.

[21] Appl. No.: 237,436

[22] Filed: Apr. 29, 1994

[51] Int. Cl.6 .............................................. B23P 15/00
[52] U.S. Cl. .................. 29/889.72; 29/889.7; 29/463
[58] Field of Search .................. 29/889.72, 889.7, 889, 29/463, 889.721

[56] References Cited

U.S. PATENT DOCUMENTS

| 3,628,226 | 3/1970 | Nelson | 29/889.72 |
| 3,736,638 | 6/1973 | Stone, Jr. | 29/889.72 |
| 5,063,662 | 11/1991 | Porter et al. | 29/889.72 |
| 5,099,573 | 3/1992 | Krauss et al. | 29/889.72 |
| 5,269,058 | 12/1993 | Wiggs et al. | 29/889.72 |

FOREIGN PATENT DOCUMENTS

| 0266954 | 5/1988 | European Pat. Off. | 29/889.721 |
| 0619107 | 3/1949 | United Kingdom | 29/889.72 |
| 2095589 | 10/1982 | United Kingdom | 29/889.72 |

Primary Examiner—Irene Cuda
Attorney, Agent, or Firm—Edward L. Kochey, Jr.

[57] ABSTRACT

Purge flow openings through chordwise ribs in hollow fan blades are formed by making partial circular cuts at the rib edges before diffusion bonding the blade halves. A full semi-circular section is used on the pressure side, but only a segment of a semicircular section is used on the suction side.

2 Claims, 1 Drawing Sheet

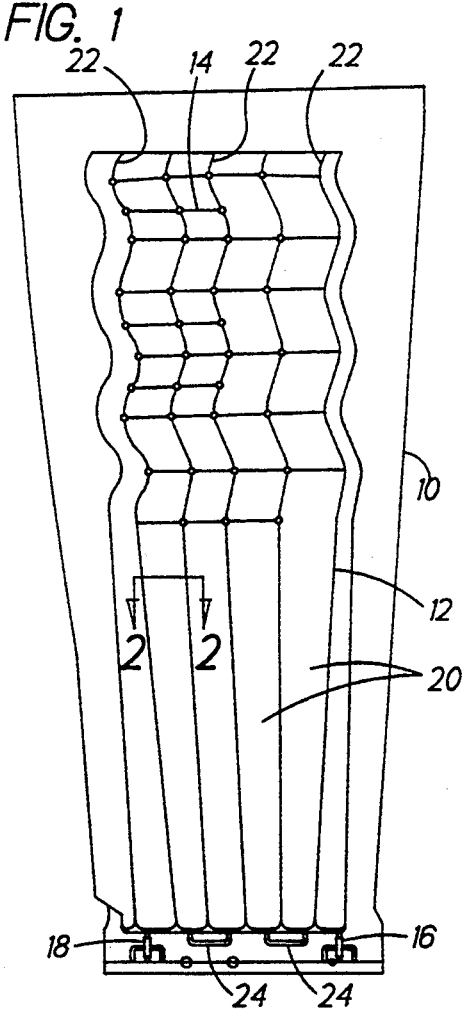
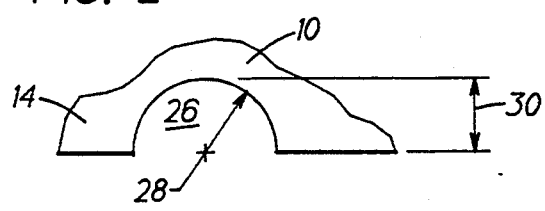
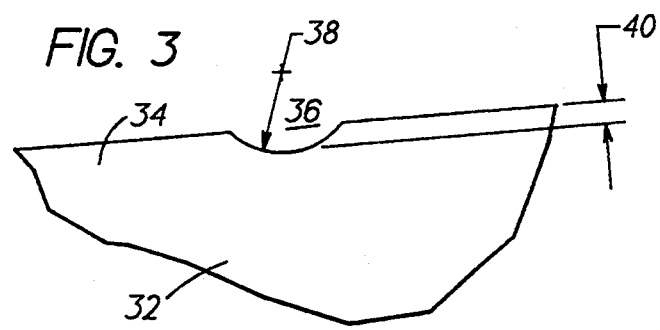
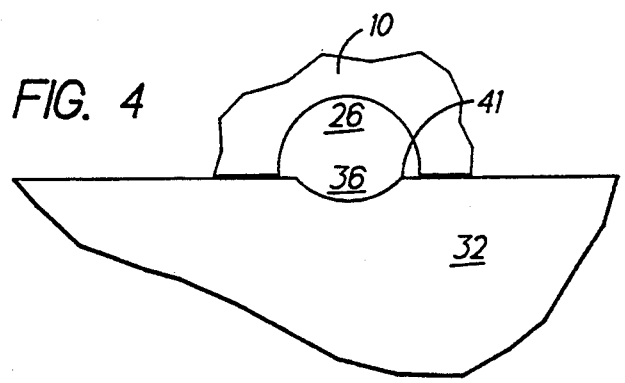
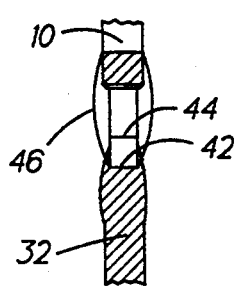
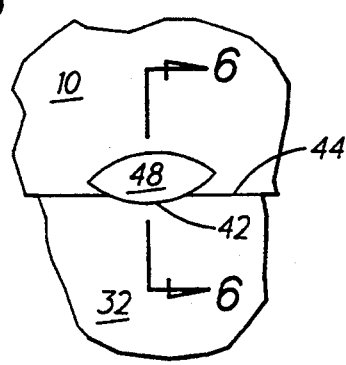
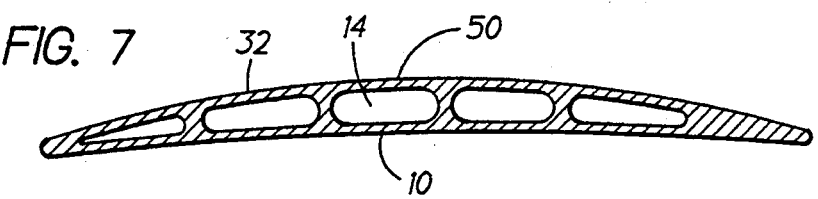

HOLLOW FAN BLADE FABRICATION

TECHNICAL FIELD

The invention relates to the manufacture of hollow airfoils having cordwise internal ribs, and in particular to the formation of vent holes in such ribs.

BACKGROUND OF THE INVENTION

Aircraft gas turbine engines sometimes use hollow fan blades to effect a weight saving. These blades generally have longitudinal ribs inside the blade to stiffen the blade with these ribs extending through from the pressure side to the suction of the blade.

A method of forming such blades is described in U.S. Pat. No. 5,063,662 issued to Porter et al. During this process the blade interior is purged with argon gas to remove all water vapor. Openings at alternate ends of alternate ribs are provided to that a sinuous flowpath is formed between the ribs permitting the purge gas flow through the entire blade. A sufficient flow rate must be maintained to avoid stagnant pockets which would not be cleared.

The fan blades of a gas turbine engine must be designed for consideration of foreign object damage. This can occur as a result of bird strikes or because of ingestion of foreign material from the ground. Cordwise ribs therefore are added with sections between the longitudinal ribs. The placement of these cordwise rib sections is determined by the strength requirement of particular locations. Such ribs are at locations which would block the purge flow through the blade.

Semi-circular cuts of each half prior to diffusion bonding the two halves together have been used. During an object impact bending around a radial axis occurs, with the pressure side of the blade going into tension and the suction side going into compression. At the hole locations the cordwise ribs have been found to buckle. This buckling has produced sufficient strain to cause local cracking of the cordwise rib.

The use of a semi-circular cut on only one half of the blade has produced too restrictive a final opening. Material from the uncut side flows up into the opening.

SUMMARY OF THE INVENTION

Two blade halves are formed prior to diffusion bonding together. Each blade half is formed with the longitudinal and cordwise ribs in place. Openings through the longitudinal ribs are formed in the conventional manner. At the edge of each cordwise rib section in the pressure side of the blade a semi-circular hole is formed with a depth substantially equal to the radius. On each cordwise rib section of the suction side of the blade a segment of a radius r but a depth of approximately 0.4 r is formed.

The two halves are diffusion bonded together with the semi-circular holes and the segments and registration and the blade is thereafter formed into the airfoil shape.

It has been found that the buckling and cracking at the opening location does not occur when the openings are formed as described above, and also that the openings are maintained of sufficient size to permit appropriate flow rate for purging.

BRIEF DESCRIPTION OF THE DRAWINGS

FIG. 1 is a view of one half a blade;

FIG. 2 is taken along section 2—2 of FIG. 1 showing a hole in the edge of the rib segment on the pressure side of the blade;

FIG. 3 is a view showing the hole in the web of the suction side of the blade;

FIG. 4 is a view showing both holes in registration before bonding;

FIG. 5 is a view showing both holes after bonding;

FIG. 6 is a section 6—6 taken through FIG. 5 showing the bonded part; and

FIG. 7 is a section showing a final formed blade.

DESCRIPTION OF THE PREFERRED EMBODIMENT

FIG. 1 shows the pressure side blade half 10 with a plurality of longitudinal ribs 12 and a plurality of cordwise rib sections 14 extending between adjacent longitudinal ribs. At the root of the blade an inlet purge opening 16 and an outlet purge opening 18 is located to permit purging of the blade interior during fabrication. Continuous flow channels 20 are arranged in a sinusoidal flow relationship with conventional openings at locations 22 and with root openings at locations 24. Openings are also provided through the cordwise rib sections 14 with a portion of such openings being located in the pressure side half as shown in FIG. 2.

A rotating cutter forms semi-circular hole 26 in the edge of each cordwise rib 14. This hole has a radius 28 and a depth 30 which is substantially the same as the radius.

The suction side 32 also has a plurality of rib segments 34. The same cutter is used to produce in each rib segment a hole 36 of a radius 38 but with a depth of 40, which is between 0.3 and 0.4 of the radius. As shown in FIG. 4 these holes 36 and 26 are placed in registration for diffusion bonding of the two blade halves together. Edges 41 of the hole 36 are located within the space of hole 26.

The material flow resulting during diffusion bonding is shown by FIG. 5. Surface 42 of the hole on the suction side is very close to the interface 44 between the two bonded portions. FIG. 6 is a section showing the bonded part with protrusions 46 formed on either side of the flow hole 48.

The unsupported portion of the chordwise rib of blade half 32 is now surface 42. This is compared to the prior art surface which is more remote from the bonding line. When the adjacent material goes into compression during object impact, this unsupported portion is far less remote from the interface 44 than with the conventional circular holes. Therefore a stiffening is achieved which deters buckling of the material in this area. Strength is not a factor here but the improved inertia in cross section 32 combined with a more favorable neutral axis location prevents buckling and avoids the strain resulting in cracking of the web.

FIG. 7 shows the final blade form 50 formed after the blade is formed into an airfoil shape.

It is believed that good results can be obtained with some variation in the depth of the hole 36 of the blade suction side. A depth range from 0.2 to 0.5 of the radius is considered acceptable, depending on the amount of deformation during diffusion bonding. The lesser depth could be used with low deformation bonding.

Fabrication in this manner makes the suction side of the hole substantially disappear. This hole will not initiate cracks during foreign object impact.

We claim:

1. A method of forming a hollow fan blade having both longitudinal and cordial internal ribs connecting the pressure side and the suction side comprising:

forming a suction side blade half with internal longitudinal ribs and cordwise rib sections between adjacent longitudinal fibs;

forming a pressure side blade half with internal longitudinal ribs and cordwise rib sections between adjacent longitudinal ribs;

forming connecting openings through said longitudinal ribs at a location to enable a sinuous flowpath through the channels between said longitudinal ribs;

forming at the edges of each cordwise rib section of said pressure side a semi-circular hole of radius r and depth r;

forming at the edge of each cordwise rib section of said suction side a segment of radius r and a depth of between 0.2 r and 0.5 r;

diffusion bonding said blade halves together with said semi-circular holes and said segments in registrations; and forming said bonded blade into an airfoil shape.

2. A method of forming a hollow fan blade having both longitudinal and cordial internal ribs connecting the pressure side and the suction side comprising:

forming a suction side blade half with internal longitudinal ribs and cordwise rib sections between adjacent longitudinal ribs;

forming a pressure side blade half with internal longitudinal ribs and cordwise rib sections between adjacent longitudinal ribs;

forming connecting openings through said longitudinal ribs at a location to enable a sinuous flowpath through the channels between said longitudinal ribs;

forming at the edges of each cordwise rib section of said pressure side a semi-circular hole of radius r and depth r;

forming at the edge of each cordwise rib section of said suction side a segment of radius r and a depth of between 0.3r and 0.4 r;

diffusion bonding said blade halves together with said semi-circular holes and said segments in registrations; and forming said bonded blade into an airfoil shape.

* * * * *